L. W. Teeter,
Flour Packer,
Nº 59,872. Patented Nov. 20, 1866.
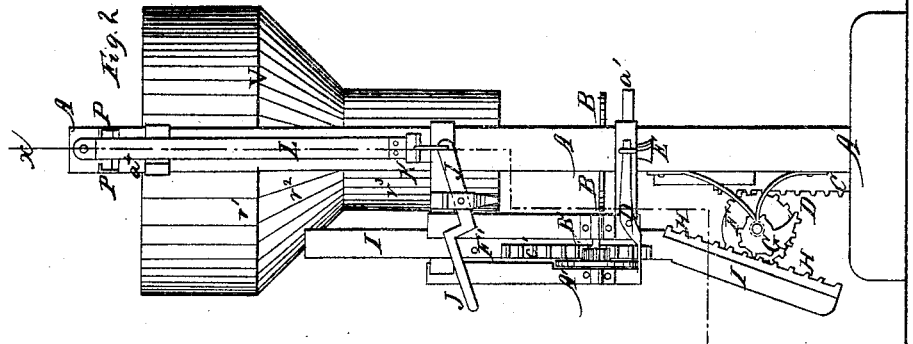
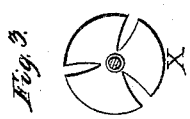
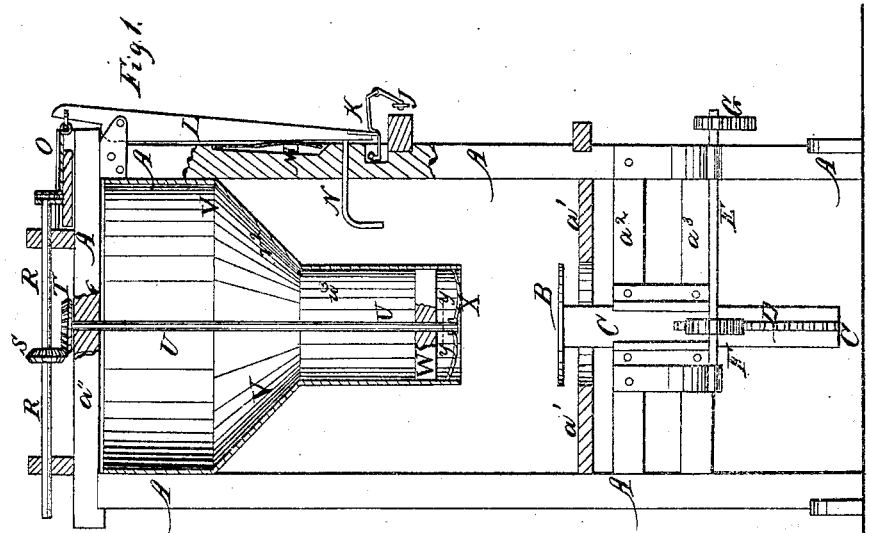

United States Patent Office.

IMPROVEMENT IN FLOUR PACKERS.

LEWIS W. TEETER, OF HAGERSTOWN, INDIANA.

Letters Patent No. 59,872, dated November 20, 1866.

SPECIFICATION.

TO ALL WHOM IT MAY CONCERN:

Be it known that I, LEWIS W. TEETER, of Hagerstown, in the county of Wayne, and State of Indiana, have invented a new and useful improvement in Flour Packer; and I do hereby declare that the following is a full, clear, and exact description thereof, which will enable others skilled in the art to make and use the same, reference being had to the accompanying drawings forming part of this specification, in which—

Figure 1 is a sectional view of my improved flour packer, taken through the line $x\ x$, fig. 2.

Figure 2 is a side view of the same

Figure 3 is a detail sectional view taken through the line $y\ y$, fig. 1.

Similar letters of reference indicate like parts.

My invention has for its object to furnish an improved flour packer by means of which the flour may be packed more evenly than it can be with the packers now in use, and it consists in the arrangement of certain parts, as will be hereinafter more fully explained.

A is the frame of the machine; B is the circular platform upon which the barrel stands while being filled. This circular platform moves up and down, through a hole in the table, $a^1$, attached to the frame, A, of the machine, and is attached to the upper end of the slide bar C. The bar C slides in guides attached to the cross-bars $a^2$ and $a^3$ of the frame, and to its front side is attached a rack D; E is a shaft revolving in bearings attached to the frame A, as shown, and to which motion is given by any convenient power. To the shaft E is attached a cog-wheel F, which meshes into the teeth of the rack D, and by its revolution raises and and lowers the slide C B; and the barrel G is an eccentric cog-wheel, made in the form represented in fig. 2, the teeth of which mesh into the teeth of the inclined rack H, attached to the lower inclined end of the slide bar I; the bar I slides in guides attached to the side of the frame A. J is a lever pivoted to a support attached to the side of the frame A. The free end of the lever J extends out in front of the machine, so that it can be operated by hand, when necesssary. The rear end of the lever J is connected by a link to the spring-catch K, as shown in figs. 1 and 2. The other end of the catch K is attached to the side of the frame A. L is a lever pivoted to the side of the frame A, in such a position that its lower end, when drawn in, will catch upon and be held by the spring-catch K. M is a spring, one end of which is attached to the frame A, and the other end presses against the lower part of the lever L, forcing it out whenever it is released from the catch K. N is an arm attached to the lower end of the lever L, by means of which, the said lower end of the lever may be drawn in so as to come in contact with the catch K. The upper end of the lever L is pivoted to the end of the slide O, which slides in guides P, upon the top of the frame A, and the other end of which is connected to the end of the shaft R, in such a way as not to interfere with the revolution of said shaft. The shaft R revolves in bearings attached to the upper cross-piece $a^4$ of the frame A, in which it can move freely in the direction of its length, as it is operated upon by the lever L. S is a bevel gear-wheel, the teeth of which mesh into the teeth of the bevel gear-wheel T, attached to the upper end of the vertical shaft U. V is the hopper, which is attached to and supported by the frame A. The upper part, $v^1$, of the hopper is cylindrical; the central part, $v^2$, cone-shaped; and the lower part, $v^3$, cylindrical, and of such a size as to enter a flour barrel and reach almost to its bottom. The shaft V is supported by and revolves in bearings in the upper cross-piece $a^4$ of the frame A. This shaft extends down to the lower end of the hopper, and is kept in its proper position by bearings W attached to the sides of the part, $v^3$, of the said hopper. To the lower end of the shaft U is attached the auger or screw packer X, which has three wings curved into the form shown in figs. 1 and 3, so that, as the screw revolves, the said wings may slide over the flour, pressing it down into the barrel. A' is a hand-wheel, the shaft of which revolves in bearings attached to the side of the frame A; B' is a pinion-wheel attached to the shaft of the hand-wheel A', and which meshes into the teeth of the rack C', attached to the side of the slide bar I, as shown in fig. 2; D' is a friction lever, one end of which terminates in a rubber, and rests against the face of the hand-wheel A'. To the other end of said lever is suspended the movable weight E', by means of which the pressure upon the hand-wheel A' is regulated as required. By means of this arrangement of gearing the barrel can be raised and lowered by hand when desired, without starting the machinery. In using the machine, the empty barrel is placed upon the circular platform B, and then raised either by reversing the action of the machine, or by means of the hand-wheel A', until the screw packer X reaches almost to the bottom of the barrel. Then by drawing in the lower end of the lever L, by means of the rod N, until the spring-catch grasps it, the machine is thrown into gear and started. As the flour passes through the hopper into the barrel, it is pressed down by the screw packer X, the barrel at the same time descending and the slide I ascending. By the time the barrel is filled, the pin F', attached to the side of the said slide I, is brought in contact with the lever J, and raises it. This frees the lever L from the catch K, when the action of the spring M immediately throws the machine out of gear and stops it. The filled barrel can then be removed and an empty one put in its place to be filled in turn.

What I claim as new, and desire to secure by Letters Patent, is—

The flour packer, the operating parts of which consist of the platform B, rack slide C D, eccentric G, inclined rack H, slide I, pin F, lever J, spring-catch K, spring lever L, slide O, shaft R, gear S T, shaft U, packer X, when constructed and arranged to operate together substantially as and for the purpose specified.

LEWIS W. TEETER.

Witnesses:
 WATKIN WILLIAMS,
 THOS. N. WILLIAMS.